D. W. STRICKLAND.
CULTIVATOR.
APPLICATION FILED MAY 27, 1921.
1,427,424.
Patented Aug. 29, 1922.
2 SHEETS—SHEET 2.
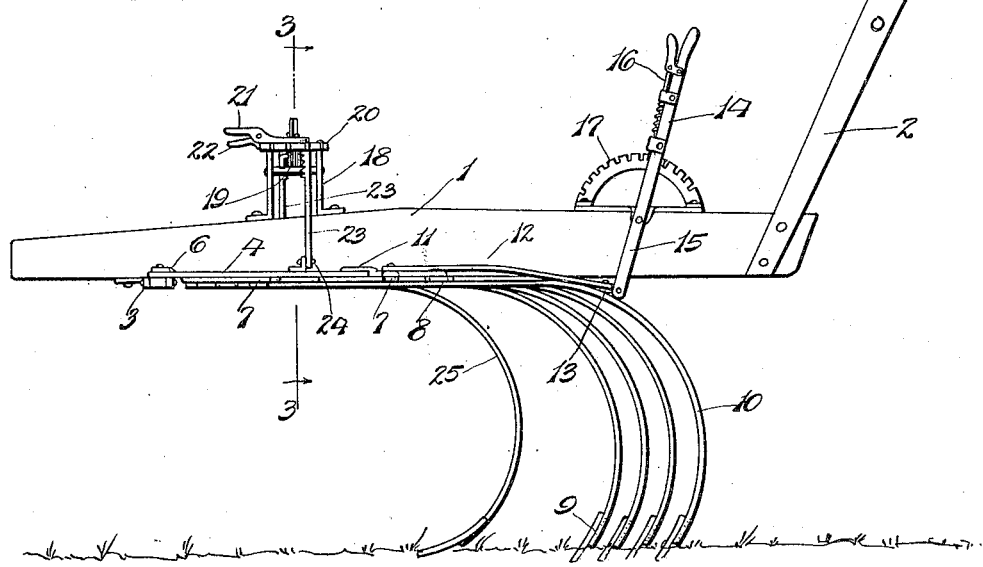
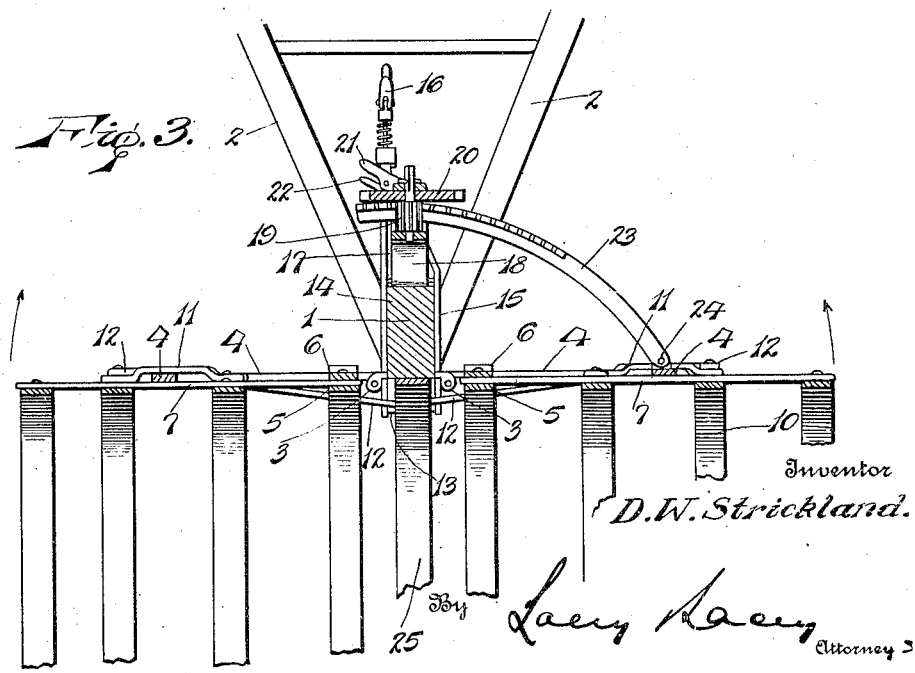
Inventor
D. W. Strickland.

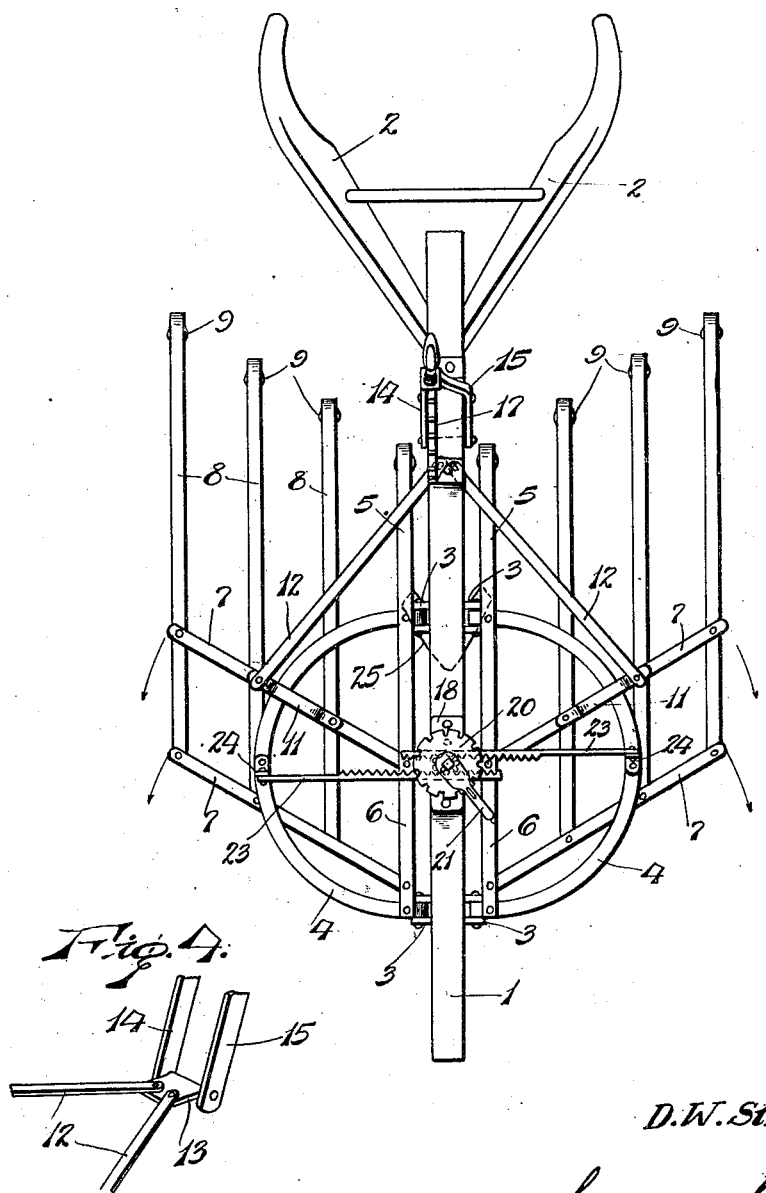

UNITED STATES PATENT OFFICE.

DEWITT W. STRICKLAND, OF TYLERTOWN, MISSISSIPPI.

CULTIVATOR.

1,427,424.  Specification of Letters Patent.  Patented Aug. 29, 1922.

Application filed May 27, 1921. Serial No. 473,213.

*To all whom it may concern:*

Be it known that I, DEWITT W. STRICKLAND, citizen of the United States, residing at Tylertown, in the county of Walthall and State of Mississippi, have invented certain new and useful Improvements in Cultivators, of which the following is a specification.

This invention relates to cultivators and has for its object the provision of simple and efficient means whereby the gangs of cultivator blades or shovels may be adjusted to the inclination of the sides of hills or rows which are to be cultivated and may be also adjusted so as to run closer together or further apart as may be desired and set to turn aside the dirt or stones as may be needed. The invention is illustrated in the accompanying drawings and will be hereinafter fully set forth.

In the drawings—

Figure 1 is a plan view of a cultivator constructed in accordance with my present invention;

Fig. 2 is a side elevation of the same;

Fig. 3 is a transverse section taken on the line 3—3 of Fig. 2;

Fig. 4 is a detail perspective view showing the connection between an adjusting lever and the links which set the cultivator gangs through the manipulation of said lever.

The main beam 1 may be of the usual or any preferred construction and handles 2 are secured to the rear end thereof in the usual manner. To the sides of the main beam 1, I secure the spaced brackets 3 which constitute hinge lugs and may be of any well-known type. To the said lugs or brackets, I pivotally or hingedly attach the ends of semi-circular supporting bars 4 and the innermost cultivator beams 5 are secured to and carried by the ends of these supporting bars or arms, reinforcing bars or straps 6 being secured to the upper sides of the supporting arms immediately over the said cultivator beams and between the said reinforcing bars 6 and the cultivator beams 5 at about the centers of said bars and adjacent the front ends thereof, I pivotally secure the inner ends of links 7. Outer cultivator beams 8 are pivotally attached at equi-distant points to the said links 7 and extend rearwardly therefrom, all of the said cultivator beams being equipped with cultivator shovels 9 of any preferred type, and it will be noted that the cultivator beams have their rear ends curved downwardly, as shown at 10, to form standards or supports for the shovels. I thus provide a cultivator of the spring-tooth type, although other forms of cultivator beams and standards may be employed. On the upper sides of the rear links 7, I secure elongated loops 11 which pass over the curved supporting arms or bars 4 whereby the links and the cultivators are supported on said arms or bars, as will be readily understood. Connecting rods 12 are pivoted at their front ends to the rear links 7 and at their rear ends are pivoted to a coupling plate 13 which is swingingly supported between the lower ends of the adjusting lever 14 and the offset arm 15 which is carried by the said lever, the lever and said offset arm being fulcrumed upon the beam 1 near the rear end thereof and the lever being equipped with a latch 16 of the usual type arranged to engage a locking rack or segment 17 secured upon the beam. It will be readily understood that by swinging the lever forwardly or rearwardly the connecting bars 12 will be moved forwardly or rearwardly and will thereby swing the rear links 7 about their pivotal connections with the braces 6 so that the cultivator beams will be caused to follow the arcs described by said links and will be thereby moved closer to or farther from each other about the main beam 1. This shifting of the parts will cause the cultivator shovels to run closer to or farther from each other and will also vary the angular relation to the main beam of lines passing through the shovels so that the gangs may be caused to act upon the soil at a right angle to the line of travel or be disposed obliquely thereto so as to more readily turn aside the weeds and other trash. It will also be noted that in all positions of the gangs the several cultivator beams will remain parallel to each other owing to the provision of the forward links 7 which move synchronously with the rear links.

On the upper side of the main beam 1, near the front end thereof and concentric with the arcuate supporting bars or arms 4, I erect a bracket or housing 18 which carries a pinion 19 and a circular notched locking plate 20, the shaft of the pinion being journaled in a portion of the bracket or housing 18 and in the said locking plate 20, as will be readily understood. Upon the upper end of the shaft of the pinion 19, I secure an operating lever 21 equipped with a latch 22 adapted to engage in one of the notches in the locking plate 20 and thereby hold the members in a set position. Arcuate rack bars 23 pass through the housing or bracket 18 and engage the pinion 19 at diametrically opposite points, the outer ends of said racks being pivoted to the arcuate supporting bars 4 approximately at the centers thereof, as shown at 24. It will be readily understood that by rotating the pinion 19, the rack bars 23 will be caused to move in opposite directions and the arms 4 will be, consequently, swung in vertical planes about their hinge connections with the brackets or lugs 3 thereby raising or lowering the gangs of cultivators equally and simultaneously and adjusting the same to the inclination of the sides of the hills or rows to be cultivated, and it will also be noted that the connecting bars 12 are so disposed that they will not interfere with the raising or lowering of the cultivator beams but will move with the respective gangs in their vertical movements and the hinged mounting of the coupling plate 13 will aid in accommodating the said connecting bars to the adjustment of the gangs.

When so desired, a central cultivator 25 may be secured rigidly to the under side of the main beam 1 to run in advance of the shovels 9 and this cultivator 25 may be utilized as an opener for a row of hills so as to mark a furrow in which seeds may be planted.

My improved cultivator may obviously be quickly adjusted so as to set the gangs of cultivator shovels or blades in any desired relation so that the work to be done will be efficiently performed and, when adjusted, the several cultivator beams will be effectually held in the adjusted position.

Having thus described the invention, what is claimed as new is:

1. In a cultivator, the combination with a main beam, of arcuate supporting bars hinged to the sides of the beam, gangs of cultivators carried by said bars, arcuate racks pivoted at their outer ends to the said supporting bars and extending upwardly and inwardly over the beam, a housing upon the beam through which the said racks pass, a locking plate fixed upon said housing, a pinion rotatably fitted in the housing and said locking plate between and meshing with said racks, said locking plate having a circular edge concentric with said pinion, an operating lever connected with said pinion, and a latch carried by the lever to engage any one of the notches in the locking plate.

2. In a cultivator, the combination of a main beam, supports hingedly mounted upon the sides of the beam, means for adjusting said supports in vertical planes, links pivoted at their inner ends to the said supports, means whereby the links will follow the vertical adjustments of the said supports, gangs of cultivator beams pivotally connected to the said links, an adjusting lever mounted upon the beam in rear of the said supports, a coupling plate hingedly connected to the lower end of the lever, and connecting bars pivoted at their rear ends to the said coupling plate and at their front ends to the rear links.

3. In a cultivator, the combination of a main beam, supports hinged to the sides of the beam and including arcuate bars, pairs of links pivoted at their inner ends to said supports, loops carried by the rear links and engaging over the arcuate bars of the supports, gangs of cultivator beams pivoted to the links, means for adjusting the supports pivotally in vertical planes, and means for pivotally adjusting the links and the gangs of cultivator beams relative to the said supports.

In testimony whereof I affix my signature.

DEWITT W. STRICKLAND. [L. S.]